US005437903A

United States Patent [19]

Christensen

[11] Patent Number: 5,437,903

[45] Date of Patent: Aug. 1, 1995

[54] STAR CELL TYPE CORE CONFIGURATION FOR STRUCTURAL SANDWICH MATERIALS

[75] Inventor: Richard M. Christensen, Danville, Calif.

[73] Assignee: The Regents of the University of California, Oakland, Calif.

[21] Appl. No.: 264,261

[22] Filed: Jun. 23, 1994

[51] Int. Cl.[6] .................... B32B 3/12

[52] U.S. Cl. .................... 428/73; 428/116; 52/309.15

[58] Field of Search .................... 428/73, 72, 116, 118; 156/197; 52/309.15

[56] References Cited

U.S. PATENT DOCUMENTS 3,501,367 3/1970 Parker .................... 428/116

*Primary Examiner*—Alexander S. Thomas

*Attorney, Agent, or Firm*—Henry P. Sartorio; L. E. Carnahan

[57] ABSTRACT

A new pattern for cellular core material used in sandwich type structural materials. The new pattern involves star shaped cells intermixed with hexagonal shaped cells. The new patterned cellular core material includes star shaped cells interconnected at points thereof and having hexagonal shape cells positioned adjacent the star points. The new pattern allows more flexibility and can conform more easily to curved shapes.

19 Claims, 2 Drawing Sheets

STAR CELL TYPE CORE CONFIGURATION FOR STRUCTURAL SANDWICH MATERIALS

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to sandwich type structural materials, particularly to light weight core material of the sandwich type, and more particularly to a core material pattern which utilizes star and hexagonal shaped cells.

Sandwich constructions involve a light weight core material that supports the faces and transfers load between them. The sandwich constructions generally utilize low density core materials. The elastic mechanical behavior for low density materials allows for deformation due to the flexibility of the core material when utilized in sandwich type constructions.

The traditional core material is of a triangular cell pattern, and more recently of a honeycomb (hexagonal) cell pattern. However, the triangular or hexagonal cell patterns of core materials do not easily conform to curved shapes needed to fabricate curved sandwich material panels. Thus, there has been a need for a core material pattern which supports the faces of the sandwich construction materials and transfers loads between the faces, while being sufficiently flexible so as to conform easily to curved shapes. The need has been satisfied by the present invention which involves a core material of a star/hexagonal pattern which allows easy conformation to curved shapes.

SUMMARY OF THE INVENTION

It is an object of the invention to provide an improved microstructure for light weight core material of sandwich constructions.

A further object of the invention is to provide a core material for structural sandwich constructions which utilizes star shaped cells.

Another object of the invention is to provide a new pattern for microstructures which includes star shaped cells.

Another object of the invention is to provide a core configuration for sandwich type materials which utilizes star and hexagonal shaped cells.

Other objects and advantages will become apparent from the following description and accompanying drawings. The invention is a new microstructure for the cellular core material to be used in sandwich type structural materials. The microstructure involves a pattern utilizing star shaped and hexagonal shaped cells. The cellular core material of this invention is much more flexible than prior known core materials and can be conformed easily to curved shapes, thereby providing for the fabrication of curved sandwich panels.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
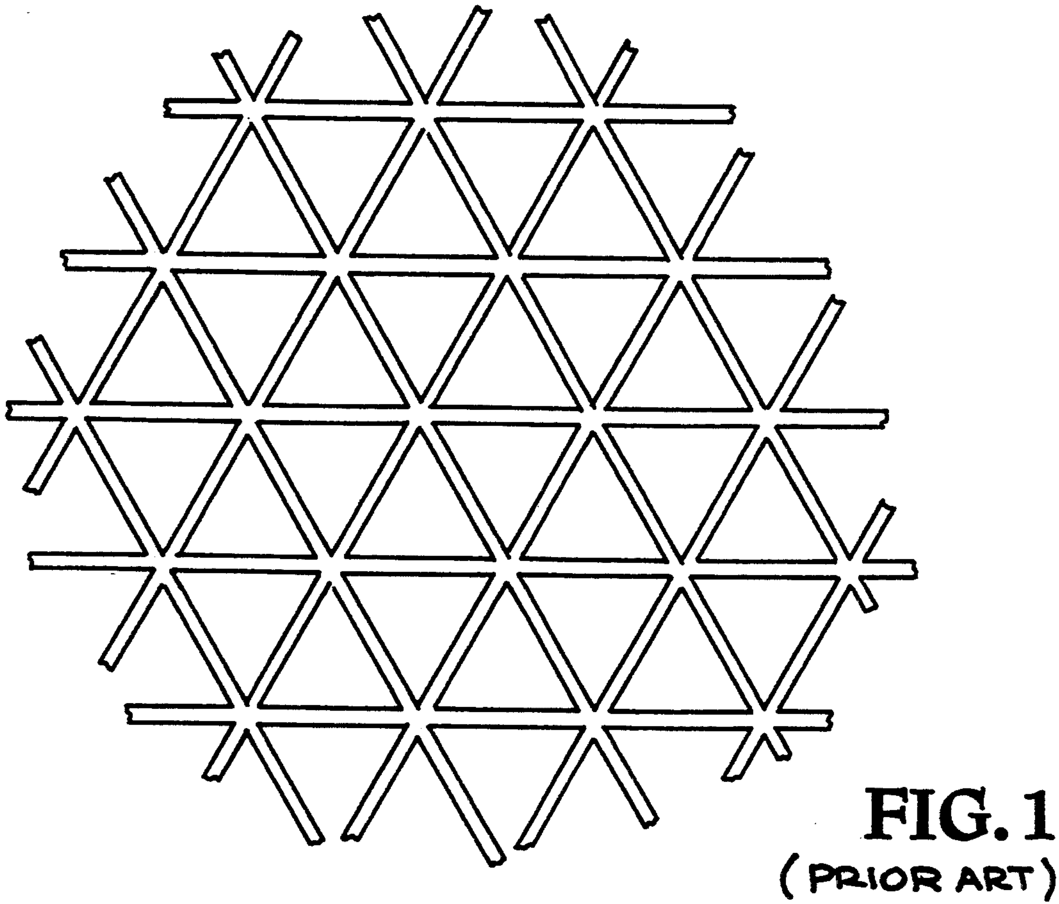
FIG. 1 (PRIOR ART)
FIG. 1 illustrates the prior known equilateral triangular cell configuration for cellular core material.
Figure 2:
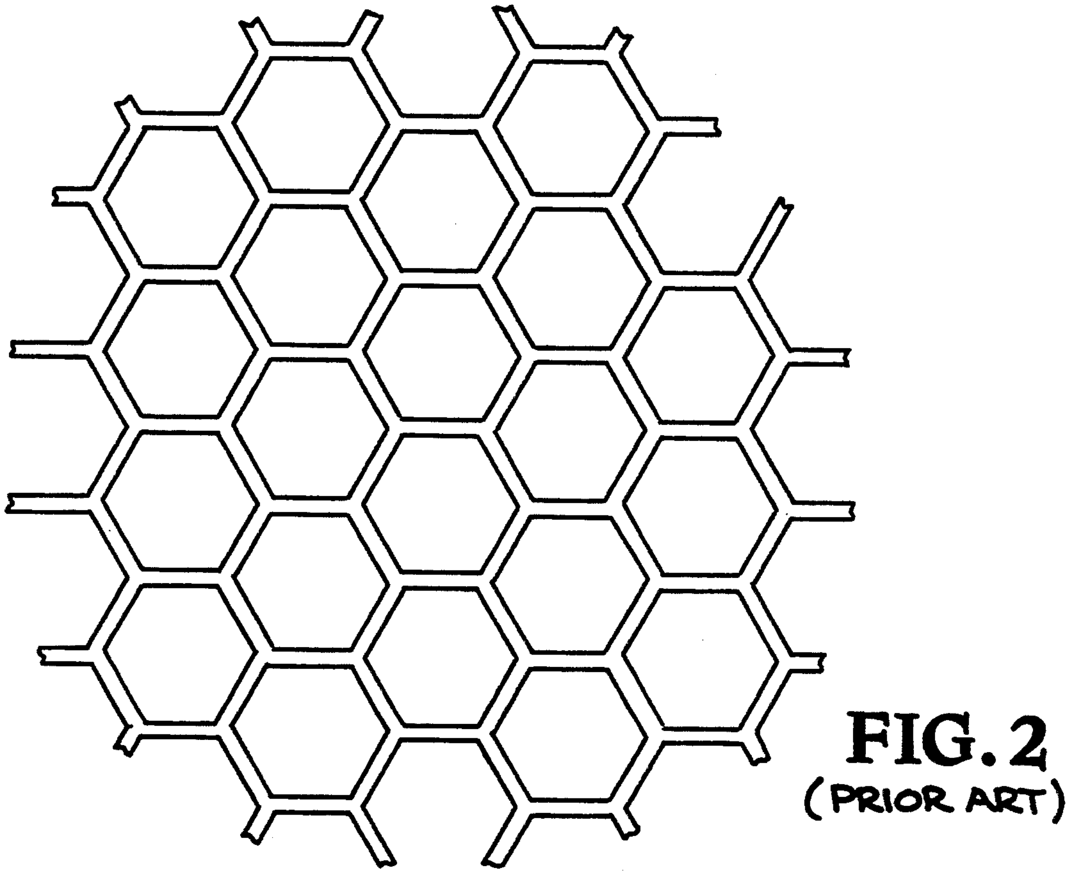
FIG. 2 (PRIOR ART)
FIG. 2 illustrates the prior known hexagonal (honeycomb) cell configuration for cellular core material.

The present invention involves a new microstructure pattern for cellular core material, such as used in sandwich type structural materials. Sandwich constructions involve light weight, low density core materials that support the faces or outlet layers and transfers loads between them. The traditional core material is composed of a pattern of equilateral triangular cells, as illustrated in FIG. 1; or a core material composed of a pattern of hexagonal cells, as illustrated in FIG. 2, which has become known as honeycomb, and has been widely utilized. However, the honeycomb core material, like the triangular core material does not easily conform to curved shapes needed to fabricate curved sandwich panels. Honeycomb can be bent into a curved saddle shape, but no other curved form is possible without buckling or crimping the cell walls. The microstructure pattern for cellular core materials made in accordance with the present invention is much more flexible than the prior known core materials and can conform easily to curved shapes.

Figure 3:
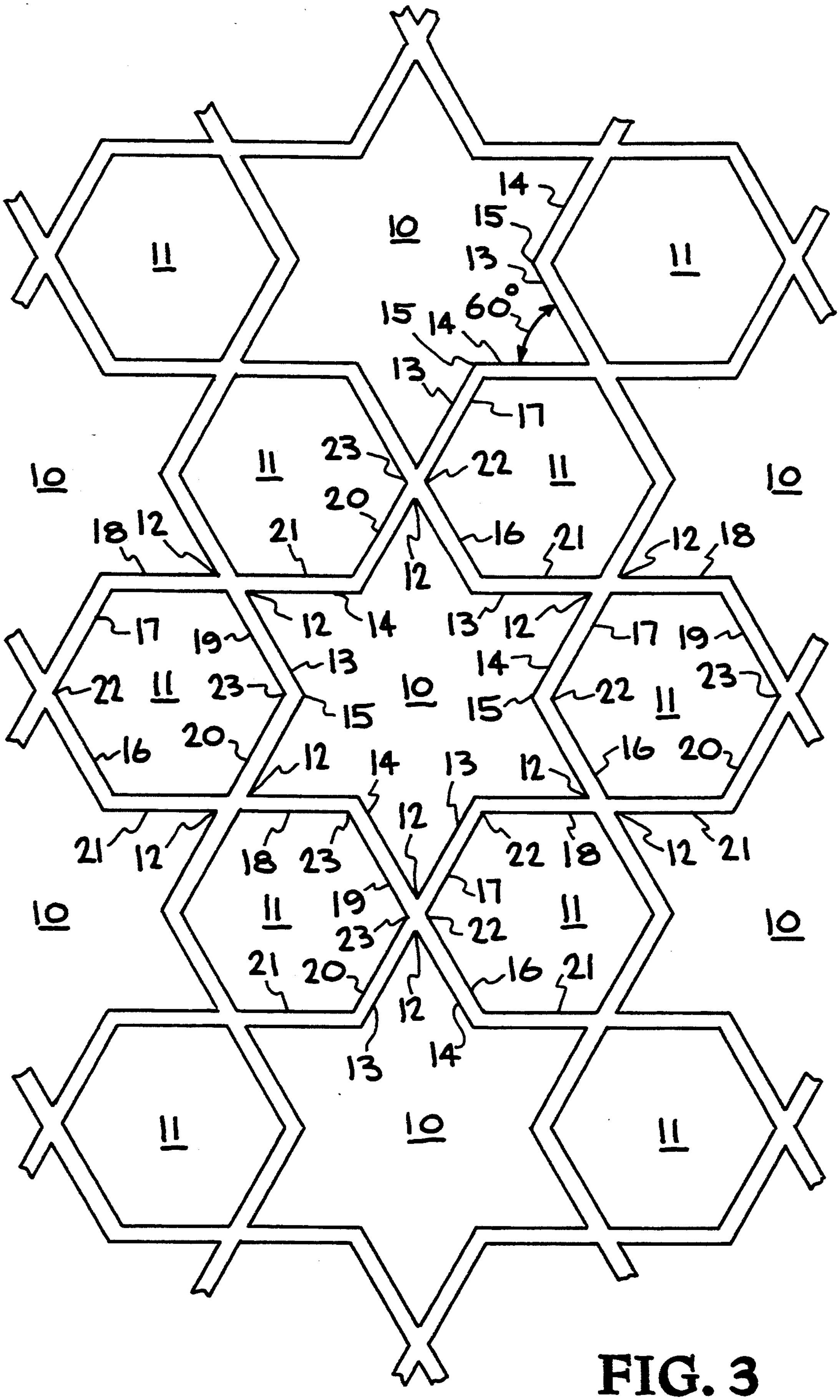
FIG. 3 illustrates the star/hexagonal cell configuration made in accordance with the present invention, for use such as in sandwich type structures.

The microstructure pattern for the sandwich core material of this invention is illustrated in FIG. 3, and is composed of a combination of six pointed star shaped cells 10 and hexagonal cells 11. As shown in FIG. 3, the star shaped cells 10 include six points 12, with each point 12 formed by interconnected members 13 and 14 positioned at a 60° angle, with member 13 of one point 11 and member 14 of an adjacent point 11 being interconnected at 15. The hexagonal cells 11 include six interconnected members or sides 16, 17, 18, 19, 20 and 21, with members or sides 16–17 and 19–20 forming points 22 and 23, with members or sides 17 and 20 forming flat surfaces between members 15–16 and 18–19. As seen in the center of FIG. 3, either of points 22 or 23 of two of hexagonal cells 11 is positioned adjacent interconnections 15 between points 12 of the central star cell 10. Note that the length of members 13 and 14 and members or sides 16–21 is the same. Two hexagonal cells 11 are positioned on opposite sides of the upper point 12 of the central star cell 10 with the members or sides 21 being adjacent the two adjacent points 12 of the central star 10. Similarly, two hexagonal cells 11 are positioned on opposite sides of the lower point 12 of the central star cell 10, with members or sides 18 of the cells 11 being located adjacent the two adjacent points 12 of central star cell 10. Thus, as seen in FIG. 3, each star shaped cell 10 is surrounded by six (6) hexagonal shaped cells 11, and each of the points 12 of the star shaped cell 10 is in contact with a point 12 of an adjacent star shaped cell 10. The microstructure composed of star shaped and hexagonal shaped cells 10 and 11 is positioned intermediate to a pair of panel faces or members which define a sandwich type structure panel as conventionally known in the art. The number of cells within the sandwich panel will vary depending on width of the panel and the desired density of the core material.

The star pattern is composed of six pointed star shaped cells along with cells of regular hexagons. This arrangement preserves the same hexagonal symmetry that exists with honeycomb. This hexagonal symmetry determines that the star pattern will have the same bending resistance in all directions. Thus, no directions of bending are stiffer or less stiff with respect to the bending necessary to form curved shapes. The star pattern tolerates dimensional variations. That is, it is not sensitive to reasonable variations either due to manufacturing tolerances or other modifications.

By way of example, with a sandwich panel having a thickness of ½ inch, the length of the members forming the points of the star cell and the length of the members or sides of the hexagonal cell is ¼ inch, and constructed of any material such as metals, ceramics, polymers, glasses, natural products, etc.

The star/hexagonal cell arrangement of FIG. 3 performs the same function of supporting the sandwich faces of the panel as does the prior honeycomb arrangement, but it is more flexible to deformation in its plane than is the honeycomb. This extra flexibility allows the core material to be easily deformed to curved configurations which is a major advantage in future manufacturing operations with commercial materials.

The elastic mechanical behavior for low density materials using the core material microstructures of FIGS. 1, 2 and 3 has been examined in an unpublished paper UCRL-JC-115779 Preprint entitled "The Hierarchy of Microstructures for Low Density Materials", R. M. Christensen, bearing a date of December 1993.

It has thus been shown that the present invention provides a cellular core material which enables the fabrication of curved sandwich type structural panels, the core material is formed from a star/hexagonal cell arrangement which provides the needed flexibility to enable the fabrication of curved sandwich panels.

A variety of efficient manufacturing methods can be foreseen. For example, individual star shaped cells and hexagonal shaped cells could be formed and bonded together. A different method is as follows. The new pattern can be divided into three distinct families of members. By cutting slots to half depth in each of these three families, they can be fitted together, much like the dividers in packaging cartons. The joints can be bonded by suitable methods.

While particular materials, parameters, etc. have been set forth to illustrate and describe the invention, such are not intended to be limiting. Modifications and changes may become apparent to those skilled in the art, and it is intended that the invention be limited only by the scope of the appended claims.

I claim:

1. A microstructure comprising:
- a plurality of star-shaped cells; and
- a plurality of hexagonal-shaped cells, each of said hexagonal-shaped cells being in contact with surfaces partially forming at least one point of a star-shaped cell.

2. The microstructure of claim 1, wherein said star-shaped cells are each of a six point type.

3. The microstructure of claim 1, wherein each of said hexagonal-shaped cells is in contact with a surface of an adjacent star-shaped cell.

4. The microstructure of claim 1, wherein two sides of each hexagonal-shaped cell are in contact with two surfaces of said star-shaped cell.

5. The microstructure of claim 1, wherein each of said star-shaped cells is surrounded by six hexagonal-shaped cells.

6. The microstructure of claim 5, wherein each point on a star-shaped cell is in contact with a point on an adjacent star-shaped cell.

7. The microstructure of claim 1, wherein each surface forming a star-shaped cell and a hexagonal shaped cell have substantially the same length.

8. The microstructure of claim 1, wherein each star-shaped cell has points formed by members which extend from each other at an angle of about 60°.

9. In a sandwich type structure, a core material composed of:
- a plurality of star-shaped cells; and
- a plurality of hexagonal-shaped cells.

10. The core material of claim 9, wherein each of said star-shaped cells has surfaces which define six points.

11. The core material of claim 10, wherein the surfaces defining each of said six points of said star-shaped cell is in contact with two hexagonal-shaped cells.

12. The core material of claim 11, wherein the surfaces defining a portion of two adjacent points on said star-shaped cell is in contact with one of said hexagonal-shaped cells.

13. The core material of claim 12, wherein said surfaces defining said points on said star-shaped extend from each other at an angle of about 60°.

14. A sandwich type structure having spaced faces between which is located a cellular core material, said cellular core material comprising:
- a plurality of star-shaped cells; and
- a plurality of hexagonal-shaped cells.

15. The sandwich type structure of claim 14, wherein each of said star-shaped cell is surrounded by six hexagonal-shaped cells.

16. The sandwich type structure of claim 15, wherein each of said star-shaped cells has six points thereon, and wherein each point of a star-shaped cell is in contact with a point of another star-shaped cell.

17. The sandwich type structure of claim 16, wherein each of said hexagonal-shaped cells are positioned between two adjacent points of a star-shaped cell.

18. The sandwich type structure of claim 17, wherein each of said points of said star-shaped cells is formed by surfaces extending at about 60° from each other.

19. The sandwich type structure of claim 18, wherein said star-shaped and said hexagonal-shaped cells are formed from material selected from the group consisting of metals, ceramics, polymers, glasses, and natural products.

* * * * *